C. GREENWOOD.
WOOD BORING MACHINE.
APPLICATION FILED AUG. 16, 1912.

1,089,547.

Patented Mar. 10, 1914.
2 SHEETS—SHEET 1.

Witnesses:
H. B. Davis
C. Doyle

Inventor:
Chester Greenwood
by Shays & Harriman
Attys.

C. GREENWOOD.
WOOD BORING MACHINE.
APPLICATION FILED AUG. 16, 1912.
1,089,547.
Patented Mar. 10, 1914.
2 SHEETS—SHEET 2.
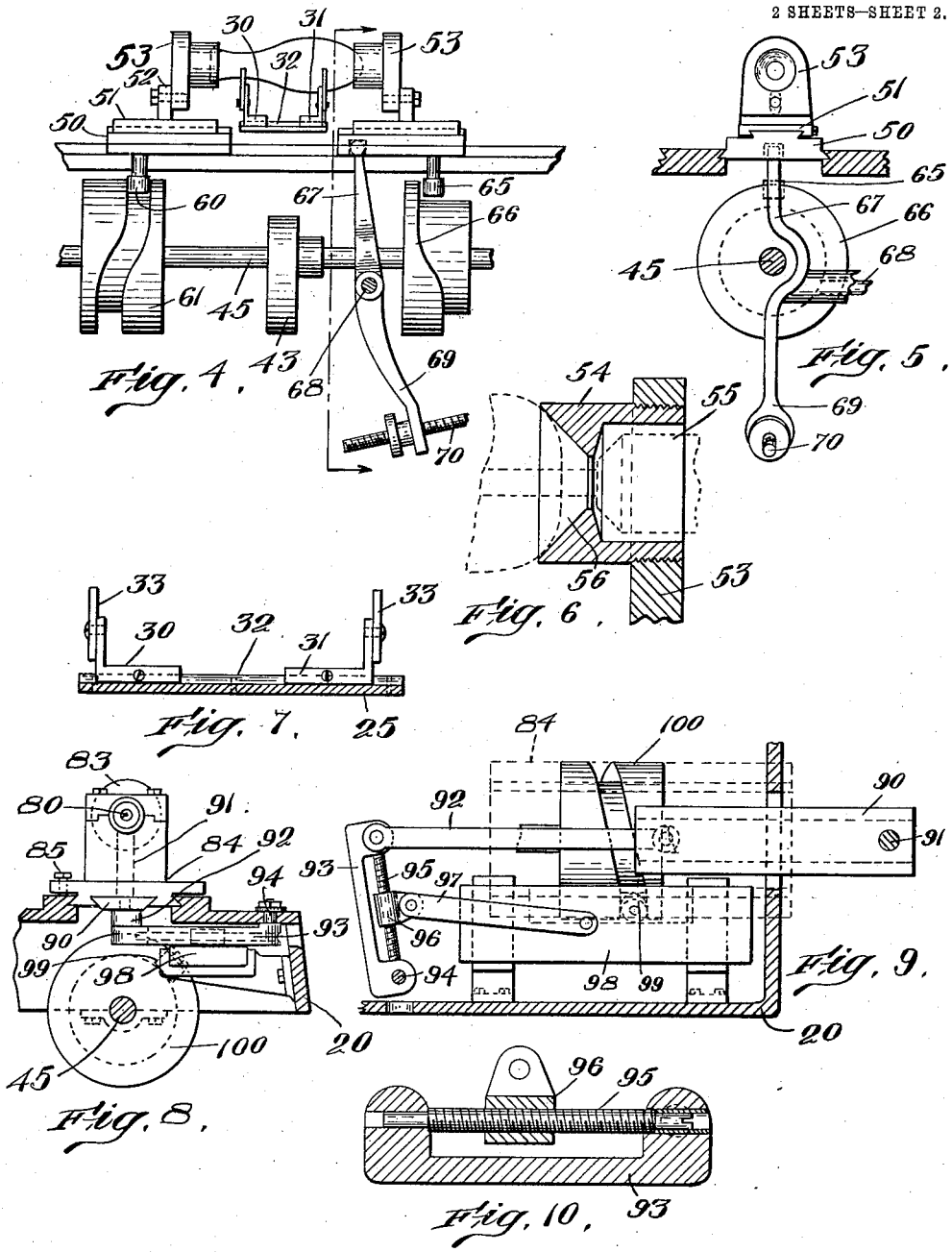
Witnesses:
H. B. Davis
C. Doyle
Inventor:
Chester Greenwood
by Anys & Harriman
Attys.

UNITED STATES PATENT OFFICE.

CHESTER GREENWOOD, OF FARMINGTON, MAINE.

WOOD-BORING MACHINE.

1,089,547.  Specification of Letters Patent.  Patented Mar. 10, 1914.

Application filed August 16, 1912. Serial No. 715,402.

*To all whom it may concern:*

Be it known that I, CHESTER GREENWOOD, a citizen of the United States, residing at Farmington, in the county of Franklin and State of Maine, have invented an Improvement in Wood-Boring Machines, of which the following is a specification.

This invention relates to boring-machines, and particularly to that type of machine designed to bore holes into or through wood handles and other small articles.

The object of the invention is the provision of an automatic machine embodying clamping members to engage the articles and supported by automatically operated elements, between which elements an endless carrier is operated, with the carrier including work holders, the actuating mechanism operating the endless carrier to position the holders successively between and in line with the clamping members.

Figure 1:
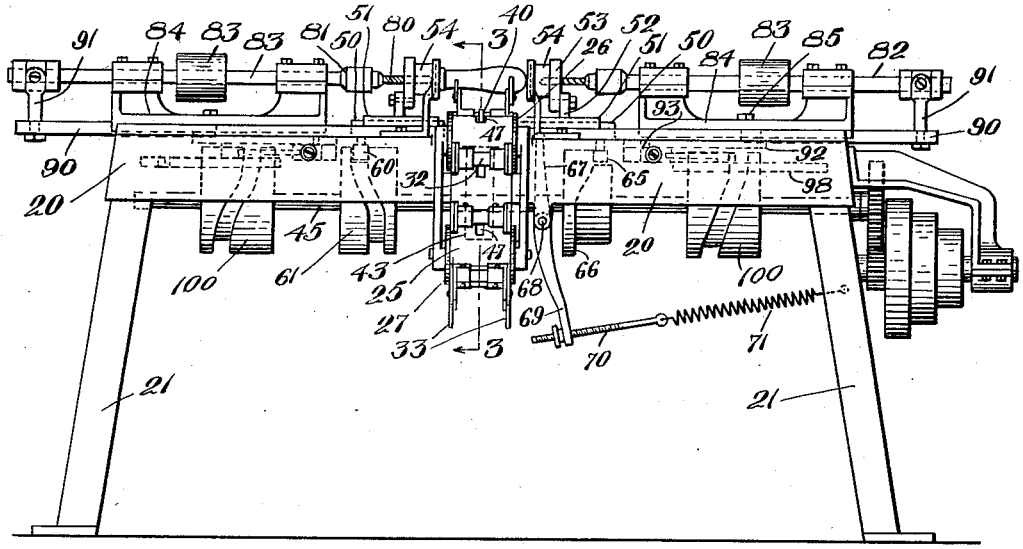
Figure 2:
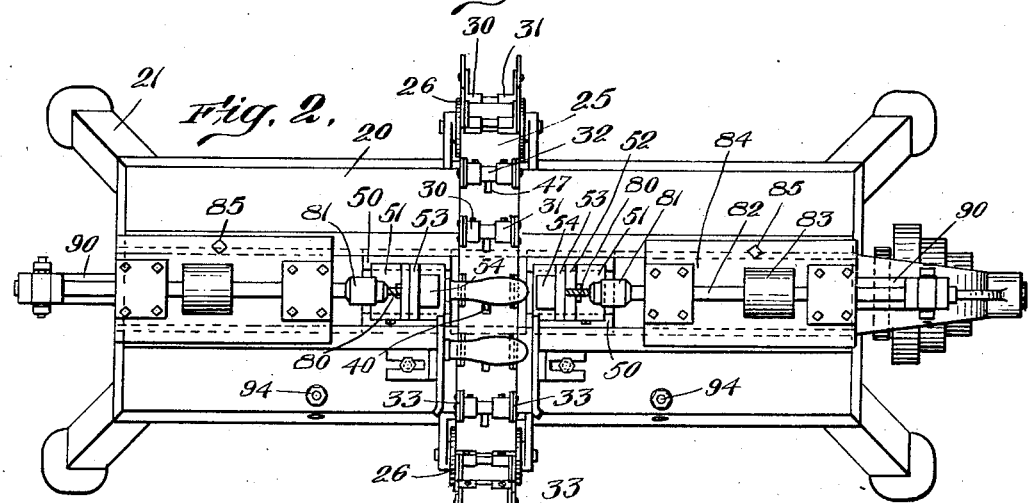
Figure 3:
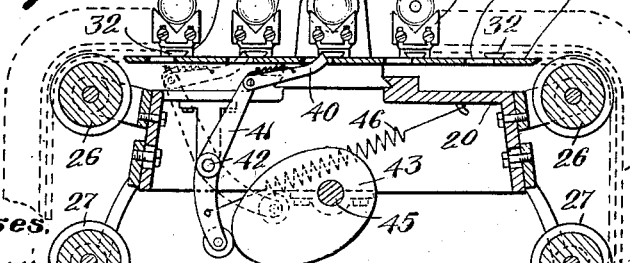

Figure 1 is a front elevation of a boring-machine embodying this invention. Fig. 2 is a plan view of the machine shown in Fig. 1. Fig. 3 is a transverse vertical section of the machine taken on the dotted line 3—3, Fig. 1, showing particularly the endless carrier for the articles, and means for moving it intermittingly but progressively. Fig. 4 is an enlarged front elevation of the clamping-means for the articles. Fig. 5 is a detail of the means for moving one of the clamping-members. Fig. 6 is an enlarged detail of the engaging-portion of one of the clamping-members. Fig. 7 is an enlarged transverse section of the endless carrier for the articles. Figs. 8, 9 and 10 are details of one of the boring-tools and operating-means therefor.

The main frame of the machine comprises a horizontal bed 20, supported by legs 21. Substantially midway the length of the bed means are arranged for supporting and moving forward the articles to be bored to a position in front of the boring-tools. As here shown, said means consists of an endless carrier adapted for movement intermittingly but progressively, and having holders adapted to engage the sides of the articles in such manner as to leave the ends exposed. The endless carrier here shown comprises a belt 25 of leather or other suitable flexible material, which passes over supporting-rolls 26, 26, and 27, 27, said rolls being journaled in brackets on the frame and the lower rolls 27, 27 being made adjustable toward and from the rolls 26, 26, by adjustably connecting their supporting-brackets with the frame. Adjustment of said rolls is required for the purpose of tightening the belt 25. Said belt has holders arranged upon it for the articles.

Referring particularly to Figs. 3 and 7, the holders each comprise a pair of oppositely disposed brackets 30, 31, the horizontal portions of which are formed with dovetail grooves along their under sides to receive a correspondingly shaped cross-bar 32 arranged transversely upon and secured to the belt 25, and said brackets are secured to said cross-bar, preferably adjustably, by set-screws, so that they may be adjusted toward and from each other to accommodate articles of different lengths. The upright side portions of said brackets have plates 33 secured to them, preferably adjustable, and said plates are formed with V-shaped notches, or notches of other shape, adapting them to engage the sides of the articles which may be placed therein by hand or otherwise. The articles are thus supported with their ends exposed which is an important characteristic of my invention. Adjustment of the plates 33 is in a vertical direction and is provided for the purpose of engaging articles of different sizes so as to hold them in correct position in front of the boring-tools. A large number of holders are usually arranged on the endless belt.

As a means to move the endless belt intermittingly the mechanism shown particularly in Fig. 3, may be employed, said mechanism comprising a pawl 40 pivotally connected with a pawl-carrying arm 41 pivoted at 42, and engaging a cam 43 secured to the main shaft 45, said arm being held in engagement with said cam by a spring 46. As the cam-shaft revolves said pawl is moved back and forth repeatedly. The belt 25 has holes 47 through it just in rear of the cross-bars 32, and said holes are made large enough to admit of the pawls projecting through them for engagement with the cross-bars. As the pawl is moved back and forth repeatedly the endless plate is moved forward intermittingly. In lieu of this particular form of mechanism for moving the endless belt other mechanism may be employed adapted for accomplishing the same result.

The carrier for the articles is moved so as to bring the articles successively in front of the boring-tools, and means are provided for engaging the ends of the articles when in such position, thereby to hold them in fixed position while they are being bored. The means here shown for fixedly holding the articles comprises a pair of clamping-members movable toward and from each other for engagement with and disengagement from the ends of the articles. Said clamping-members each comprise a base-plate 50 arranged horizontally to slide in a suitable way formed in the bed of the machine, and a supporting-plate 51 arranged on said base-plate which is adjustably secured thereto, said plate 51 having an ear 52 rising from it to which is secured an upright arm 53 having a block 54 secured to it which projects from it laterally at one side in a direction toward the article. Said block, as here shown—see Fig. 6—extends through the arm and has a hole through it for the boring-tool and is socketed or recessed at one end as at 55 to receive the end of the tool-holder, and the opposite end of said block is formed with a conical recess 56 to receive the end of the article to be bored, the inclined portion of said recess engaging the end of the article. In lieu of the clamping-member here shown, any other form of clamping-member may be provided having an inclined engaging surface for the end of the article to be bored, and a hole extended through it for the boring-tool. The base-plate of one of said clamping-members has a pin 60 extended downward from it which engages a groove in a cam-roll 61 secured to the cam-shaft 45, so that as the shaft is revolved said clamping-member is moved positively toward and from the article, thereby to engage and disengage it. The other clamping-member is designed to be moved positively in a direction away from the article and to be moved in a yielding manner in a direction toward the article, and, as here shown, the base-plate 50 of said clamping-member has a pin 65 extended downward from it which engages the face of a cam 66 secured to the cam-shaft 45, said cam acting to move said clamping-member positively in a direction away from the article; and the upper end 67 of a lever pivoted at 68 engages said base-plate, the lower end 69 of said lever being connected by a screw 70 and spring 71 with the frame, said spring acting to move the lever and thereby move the clamping-member toward the article for engagement therewith. Means such as herein provided for moving one of the clamping-members in a yielding manner for engagement with the article is of distinct advantage for the reason that the articles to be engaged by it vary slightly in length.

80 represents one of the boring-tools, two of which are here shown, arranged at opposite sides of the carrier, to engage the opposite ends of the articles, although one tool only may be employed if desired. As the means to support and operate each boring-tool is substantially alike, but one will be herein described, reference being had particularly to Figs. 8, 9 and 10. The boring-tool 80 is held by any suitable form of tool-holder 81, secured to a shaft 82, bearing a belt-pulley 83, by which it may be rotated, and said shaft is supported in bearings in a supporting-frame 84, which is adjustably supported in a dovetailed way provided in the bed of the machine, and is held stationarily in any position it may be set by a set-screw 85. Adjustment of the frame is provided for locating the boring-tool in various positions to accommodate itself to the article to be bored. The boring-tool is movable axially as well as rotarily in the bearings in said frame. As here shown, the frame 84 has a dovetailed way formed in its under side which receives a dovetailed plate 90, which is connected at one end by a post 91 with the shaft 82, so that longitudinal movement of the dovetailed plate 90 is imparted to the shaft, thereby to move said shaft axially. Said plate 90 is connected by a link 92 with the extremity of a yoke 93 pivoted at 94 to the machine-bed, and said yoke has a screw 95 arranged between its arms upon which the sleeve 96 is mounted, which is connected by a link 97 with a longitudinally movable member 98, supported by brackets and bearing a projection 99, with or without a roll thereon, which enters a groove in a cam-roll 100, secured to the main-shaft 45. As said shaft rotates the plate 98 is moved repeatedly back and forth and the yoke 93 oscillated on its pivot and the plate 90 moved repeatedly back and forth, thereby moving axially the shaft 82 bearing the boring-tool. The length of the stroke is determined by the position of the sleeve 96 on the screw 95, and may be varied by turning said screw by means of a screwdriver engaging its slotted end, see Fig. 10. The operating-means for the other boring-tool is here shown as the same as the means before described, but the cam-rolls 100 of the two operating-means are arranged on the cam-shaft, one slightly in advance of the other, so that one of the boring-tools will be moved forward in advance of the other, and begins to retreat before the other reaches the end of its stroke in an inward direction, so that at the middle of the article to be bored each tool enters the path of movement of the other, but they do not engage, and, as a result, a continuous bore throughout the length of the article is produced.

In lieu of the means here shown for moving axially the boring-tool and for varying the stroke other equivalent means may be employed, adapted for accomplishing the same result.

I claim:—

1. An automatic boring machine for wood articles, including an axially-movable boring tool, clamping members to engage the ends of the articles for the action of the boring tool, automatically-operated elements for supporting the clamping members, said clamping members being independently adjustable longitudinally of such elements, an endless carrier operating between said elements, holders mounted on said carrier, said holders being adjustable transversely of the carrier and at right angles thereto, and means to operate the endless carrier to position the holders successively between and in line with the clamping members, said carrier-operating means being wholly free of connection with such carrier for predetermined intervals to release the carrier wholly to the influence of the clamping members.

2. An automatic boring machine for wood articles, including an axially-movable boring tool, clamping members to engage the ends of the articles for the action of the boring tool, said members being formed to engage and center the articles with respect to the boring tool, an endless carrier operating between said members, holders mounted on said carrier, said holders being adjustable transversely of the carrier and at right angles thereto, and means to operate the endless carrier to position the holders successively between and in line with the clamping members, said carrier-operating means being wholly free of connection with such carrier for predetermined intervals to release the carrier wholly to the influence of the clamping members, whereby the action of the clamping members may accurately center the article with respect to the boring tool.

3. An automatic boring machine including a frame, guide rollers adjustably secured to and arranged beyond the frame, an endless carrier passing over said rollers, a plurality of bars arranged in spaced relation transversely of the carrier, holders coöperating with each bar, said holders comprising brackets slidably mounted on the bars, and plates formed with article-receiving recesses, adjustably secured to and rising from said brackets, said carrier being formed with an opening adjacent each bar, a power shaft, a cam thereon, a lever pivotally mounted on the frame and continuously operated by the cam, and a pawl carried by said lever and engaging the successive openings in the carrier to move the latter a predetermined distance in one direction, said pawl being wholly free of connection with the carrier in the movement of the pawl in the opposite direction.

In testimony whereof, I have signed my name to this specification, in the presence of two subscribing witnesses.

CHESTER GREENWOOD.

Witnesses:
LELIA E. LOCKE,
E. E. RICHARDS.

Copies of this patent may be obtained for five cents each, by addressing the "Commissioner of Patents, Washington, D. C."